Patented May 4, 1926.

1,583,191

UNITED STATES PATENT OFFICE.

CLARENCE D. SHAFFER, OF KALAMAZOO, MICHIGAN, ASSIGNOR TO TEXTILE LEATHER & METAL PRESERVER CO. INC., OF KALAMAZOO, MICHIGAN.

WATERPROOFING COMPOUND AND PROCESS OF MANUFACTURING THE SAME.

No Drawing.   Application filed January 26, 1923.   Serial No. 615,169.

*To all whom it may concern:*

Be it known that I, CLARENCE D. SHAFFER, a citizen of the United States, residing at the city and county of Kalamazoo, State of Michigan, have invented certain new and useful Improvements in Waterproofing Compounds and Processes of Manufacturing the Same, of which the following is a specification.

This invention relates to improvements in waterproofing compounds and the process of manufacturing the same.

The object of the invention is to produce by simple means an effective waterproofing compound that is easily applied and very durable in use.

Objects pertaining to details and economies will definitely appear from the detailed description to follow. I accomplish the objects of the invention by the means and process defined in the specification. The invention is clearly defined in the claims.

As heretofore manufactured, the ingredients for waterproofing material similar to my invention have been subjected to strong heat, which has an undue and damaging effect on many of the ingredients, and is costly besides. I minimize the use of heat.

In carrying out my invention I take para cumarone, known under the trade name of "cumar" 5 ounces, to which I add 8 ounces of high flash naphtha and heat the same until the "cumar" is melted and dissolved. I then add the same to 18 ounces of cold gasoline and permit the same to cool.

The second ingredient is paraffin 10 ounces, to which I add 64 ounces of gasoline, and heat the same sufficiently to melt and dissolve the paraffin.

The third ingredient consists of rubber cement, which is any high grade cement, 10 ounces, which I dilute by adding 10 ounces of gasoline to make the same very thin and fluid.

When the ingredients have cooled to preferably substantially room temperature, I preferably add the "cumar" mixture to the dissolved paraffin mixture, thoroughly mix the same, and then add the dilute rubber cement, stirring and thoroughly mixing the whole. A very good waterproofing is made without the addition of rubber, but the rubber gives the same strong continuity and adds much to the durability, and it is very readily mixed in the manner indicated. Paraffin solution and rubber will make a waterproof of low resistance.

The waterproofing as here produced makes a comparatively heavy coat and often more than is needed, and I dilute this mixture, by simply adding gasoline, to such strength as will serve the purpose. The mixture very readily waterproofs leather, canvas, cloth or any fabric, and is of use in rust-proofing metal.

"Cumar" is prepared with different melting points and that which is preferred for ordinary purposes is that which melts at 145 degrees centigrade. The higher the temperature the stronger the resistance, and "cumar" that melts at a much higher temperature of course is more highly resistant to the heat of the Tropics or the strong heat of the summer and for use in the sun. The paraffin is preferably that which has a melting point of 60 degrees centigrade.

By thoroughly dissolving these ingredients as I have indicated, I find that they may be very readily mixed cold.

The proportions may be widely varied over those that I have indicated. A small amount of "cumar" makes of course a correspondingly weaker waterproofing, and with the rubber cement omitted there is of course the lack of strong continuity secured by the use of the rubber.

Having thus described my invention, what I claim as new and desire to secure by Letters Patent, is:

1. A waterproofing preparation consisting of para cumarone in the proportion of 5 parts, dissolved in 8 parts of high flash naphtha and diluted with 18 parts of gasoline, 10 parts of paraffin dissolved and melted in 64 parts of gasoline, and 10 parts of rubber cement diluted with 10 parts of gasoline, all mixed together.

2. A waterproofing preparation consisting of para cumarone in the proportion of 5 parts, dissolved in 8 parts of high flash naphtha and diluted with 18 parts of gasoline, 10 parts of paraffin dissolved and melted in 64 parts of gasoline, and all mixed together.

3. The process of preparing waterproofing compound consisting in heating and dissolving "cumar" in high flash naphtha, diluting and cooling the same with gasoline, melting and dissolving paraffin in gasoline, and mixing the whole cold with rubber cement.

In witness whereof I have hereunto set my hand.

CLARENCE D. SHAFFER.